United States Patent
Marek

[19]

[11] Patent Number: 6,154,344
[45] Date of Patent: Nov. 28, 2000

[54] BONDED WIRE CAPTURE

[75] Inventor: Stevenson Marek, Hutchinson, Minn.

[73] Assignee: Hutchinson Technology Incorporated, Hutchinson, Minn.

[21] Appl. No.: 08/036,157

[22] Filed: Mar. 24, 1993

[51] Int. Cl.$^7$ .................................................... G11B 5/48
[52] U.S. Cl. .......................................................... 360/264.2
[58] Field of Search ................................... 360/104, 105; 248/49, 68.1, 916

[56] References Cited

U.S. PATENT DOCUMENTS

| | | | |
|---|---|---|---|
| 4,992,898 | 2/1991 | Wanlass | 360/104 |
| 5,027,239 | 6/1991 | Hagen | 360/104 |
| 5,126,904 | 6/1992 | Sakurat | 360/104 |
| 5,282,103 | 1/1994 | Hatch et al. | 360/104 |

FOREIGN PATENT DOCUMENTS

| | | | |
|---|---|---|---|
| 9209076 | 11/1991 | WIPO | 360/104 |

Primary Examiner—George J. Letscher
Attorney, Agent, or Firm—Faegre & Benson LLP

[57] ABSTRACT

A partially thinned wire support pad of a generally rectangular shape is provided extending laterally from a longitudinal edge of a base plate of a load beam. The support pad is cut from sheet material in one piece with the load beam and, during other manufacturing procedures applied to the load beam, is partially thinned to a thickness less than the thickness of the load beam. In addition to the partial thinning procedure, provides a smooth radiused convex edge is provided for the exterior perimeter of the partially thinned wire support pad. Partial thinning may also be provided to a trough at a base of channel rails to provide an area of reduced thickness to the channel to provide proximal and distal edges of the channel having a smooth well-radiused profile.

3 Claims, 4 Drawing Sheets

BONDED WIRE CAPTURE

BACKGROUND OF THE INVENTION

The present invention relates to an improved load beam for use in a head suspension for attachment to a rigid arm. One improvement consists of the provision of a support pad laterally extending from the base plate of the load beam and manufactured in one piece with the load beam, with the support pad reduced to a thickness less than the thickness of the load beam. The support pad is designed to provide support for electrical and/or optical connection means, such as wires, which interconnect the read/write head with appropriate circuitry at the actuator arm.

In addition, another improvement consists of the provision of a trough of reduced thickness at the base of a channel rail along the load beam, which channel, inter alia, supports the connection means intermediate the head and the actuator arm.

In assembling a load beam into a head suspension assembly for attachment to a rigid arm for use in dynamic storage devices of rigid disk drives, electrical and optical connection means are carried along the length of the load beam to connect the head at the flexure end of the load beam to appropriate head write driver/read preamplifier circuitry at the actuator arm. Often such connection means have been encased in Teflon or other tough, abrasion-resistant polymeric tubes which provide a measure of protection from abrasion and bending for the delicate fine gauged individual wires. Bent or U-shaped side flanges, often of a U-shaped or L-shaped profile, tab extensions or other means have been provided along the length of the load beam for securing this tubing.

In a continuing effort to reduce the Form Factor or overall size of the head suspension, the use of unprotected wires has recently been proposed. These tubeless insulated wires are generally of 40–50 gauge copper having an insulating layer of polyurethane and having a thickness ranging between about 0.00150 and 0.00260 inch. Typical composite and thin film heads currently typically use two or three wires twisted together. Heads of other technology, such as magnetoresistive heads, typically use five or six wires that are run in two twisted wire bundles. It is possible to use any number of wires for which connections can be made on the head itself. Wires need not be twisted, but can be run side by side, to further reduce head assembly height requirements.

Since these delicate and unprotected wires are brittle and of fine gauge, it is important that the surfaces with which they come in contact be smooth and very well radiused, to prevent unwanted abrasion and bending of the connection wires.

An extension from the base plate region of the load beam has been proposed as a situs for affixing such connection wires. According to currently existing technology, this type of extension, as illustrated in profile in FIGS. 1 and 2, has been through-etched along with the load beam from a single piece of sheet material, and generally has a concave or even a double-concave edge profile, which can present a sharp, knife-like edge which can act to cut or shave the insulation layer of the connection means.

BRIEF SUMMARY OF THE INVENTION

In a load beam for use in a head suspension for attachment to a rigid arm, a wire support pad is provided extending laterally from a longitudinal edge of a base plate of the load beam. The surface of the support pad is partially thinned to a thickness less than the original thickness of the load beam. The partial thinning process yields an exterior perimeter of the support pad which has a smooth radiused convex edge, rather than the sharp, abrasive profile offered by the prior through-etched support pad. The support pad is of a generally rectangular shape.

Further, a trough of reduced thickness is provided at the base of a channel rail along the load beam by partially thinning the base area of the channel rail to a thickness less than the original thickness of the channel. Here also, the partial thinning process yields an area of reduced thickness in which the proximal and distal ends of the base trough of the channel rail present a smooth radiused convex edge, and the reduced thickness region blends into the full thickness area of the channel with a smooth radiused convex edge.

The method of forming a partially thinned support pad according to the present invention comprises manufacturing, from a sheet of material of a given thickness, a load beam with a support pad projecting laterally from a longitudinal edge of a base plate of the load beam, and partially thinning the support pad to a thickness less than the given thickness. The method of forming a partially thinned base of the channel rails according to the present invention comprises manufacturing, from a sheet of material of a given thickness, a load beam with channel rails projecting from longitudinal edges of the load beam, forming the channel rails to a U-shaped or L-shaped profile, and partially thinning the base of the channel rails to a thickness less than the given thickness. The partial thinning procedure can be carried out by any suitable means which will provide a convex, well-radiused edge to the perimeter of the support pad, to the edges of the base trough area of the channel rails. Thinning by etching or by EDM have been found to be suitable. The partial etching inherently provides a smooth radiused convex edge to the thinned area.

DETAILED DESCRIPTION OF THE INVENTION

Figure 1:
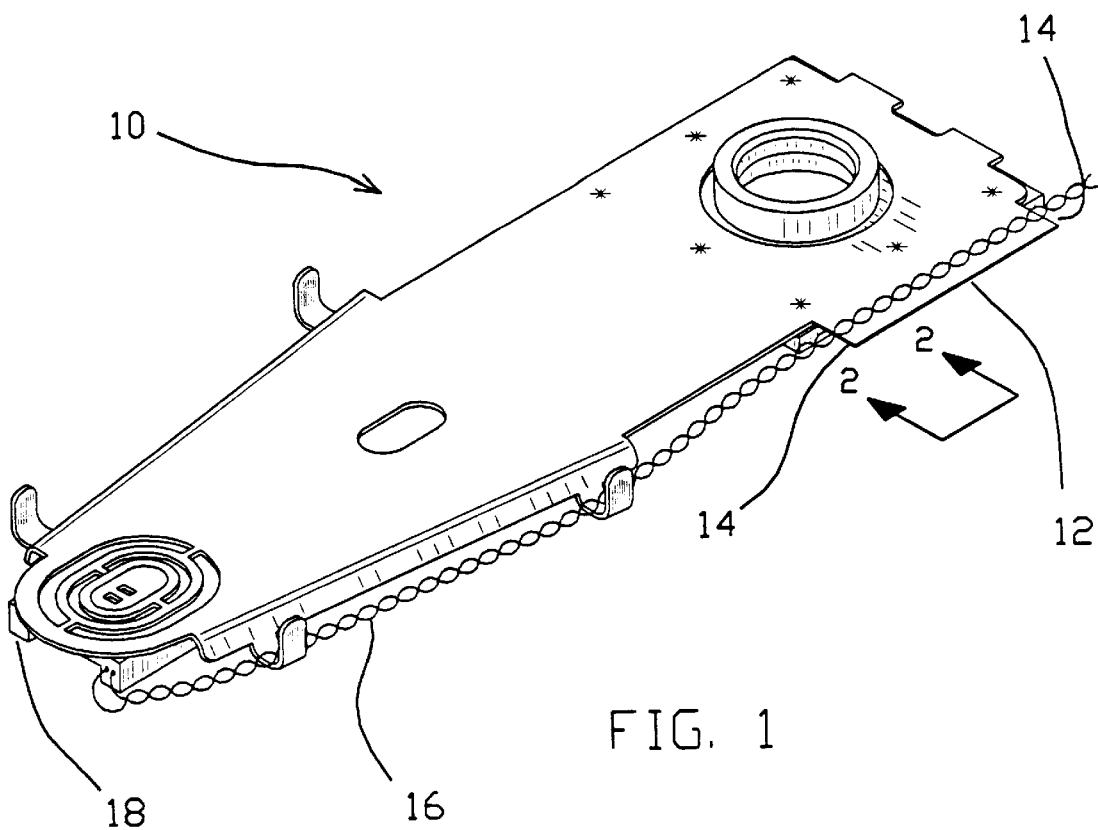
FIG. 1 is a perspective view of a prior art load beam and an integral support pad.
Figure 2:
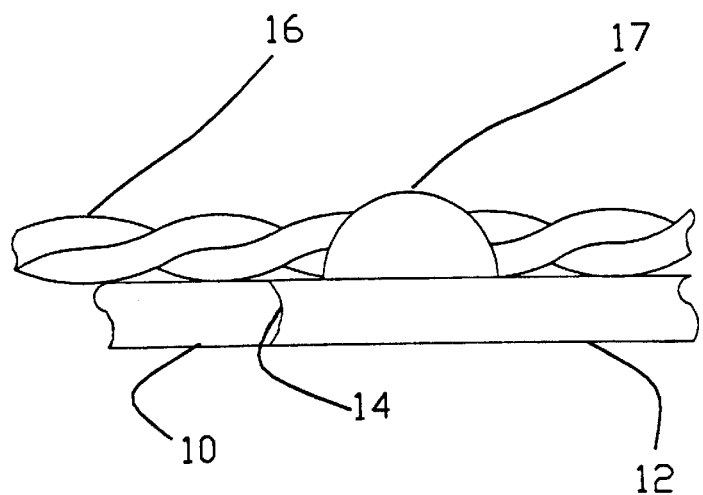
FIG. 2 is a profile view of a prior art load beam and support pad of FIG. 1, taken along the line 2—2, showing the uniform thickness of the load beam and support pad and a concave edge on the support pad.

FIGS. 1 and 2 illustrates a perspective view of prior art load beam 10 and integral support pad 12. FIG. 2 is a profile view of prior art load beam 10 and support pad 12 of FIG. 1, taken along the line 2—2, showing the uniform thickness of load beam 10 and support pad 12 and concave edge 14 on support pad 12. The concave edge 14 profile is a normal result of the etching process. As can be seen, concave edge 14 of support pad 12 provides a sharp or knife-like edge to tubeless insulated wires 16 passing thereover. Wires 16 are adhered to support pad 12 by adhesive 17. Whether wires 16 cross the support pad 12 on the same side or opposite side of load beam 10 as the read/write head 18, depending on the overall assembly design, wires 16 can add to the thickness of entire head suspension assembly. Wire thickness generally represents an obstacle to minimizing assembly thickness.

Figure 3:
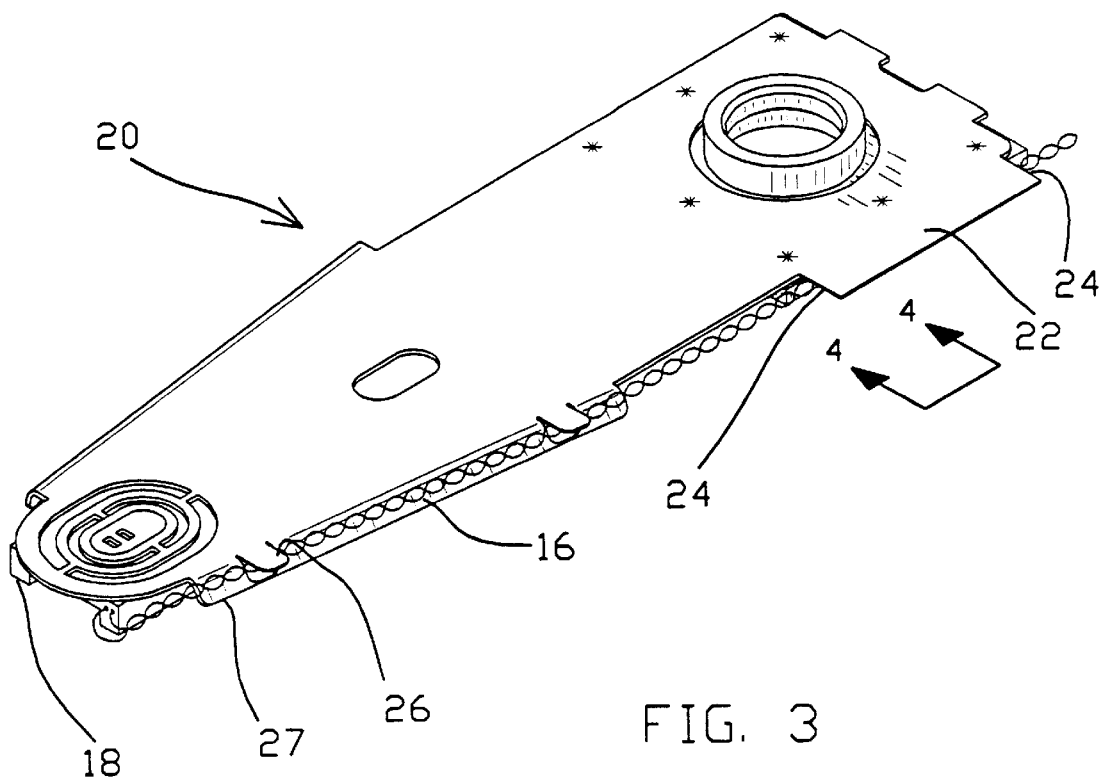
FIG. 3 is a perspective view of a load beam and integral support pad of the present invention.
Figure 4:
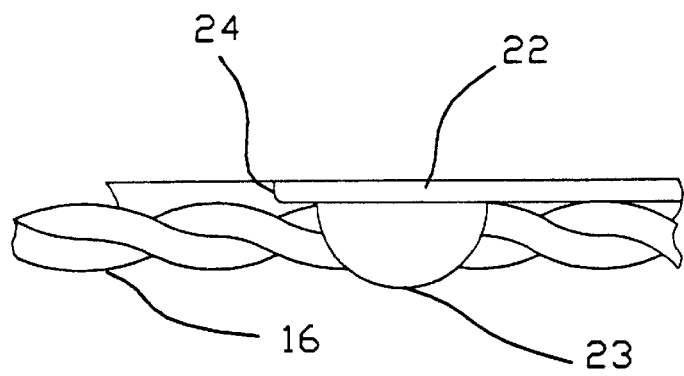
FIG. 4 is a profile view of the load beam and support pad of FIG. 3, taken along the line 4—4, showing the partially thinned support pad and the well-radiused edge thereof.

FIGS. 3 and 4 illustrate load beam 20 with partially thinned support pad 22 according to the present invention. In addition to partially thinning the entire surface of support pad 22 to a thickness less than that of load beam 20 and the original support pad, perimeter edge 24 of support pad 22 is provided with a well radiused convex curvature profile, so that edge 24 will not abrade the insulation of wires 16 or other connection means passing thereover. Load beam 20 and depending support pad 22 are originally cut in one piece from appropriate stainless steel sheet material.

The partial thinning can be done by any suitable process, such as by etching or EDM and can be performed at the same time and under the same conditions as other manufacturing procedures used in preparing load beam 20. It has been found that partial thinning by partial etching will inherently provide a well-radiused convex profile to edge 24 of support pad 22. Partially thinned support pad 22 provides room for wires 16 to be placed on the same side of load beam 20 as head 18 to use the same Z-axis space as head 18. By using the same Z-axis space as head 18, additional clearance is gained for positioning of a head lifting device.

Figure 7:
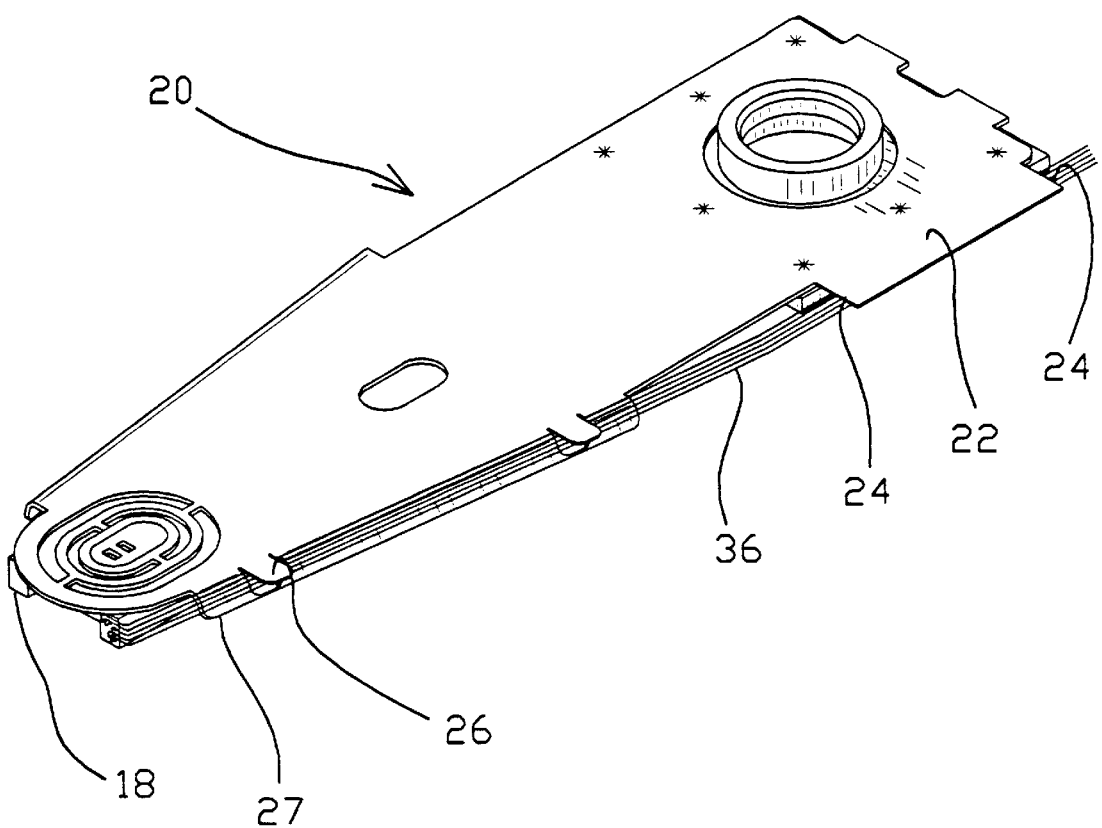
FIG. 7 is a perspective view of another load beam and support pad of the present invention, similar to the view shown in FIGS. 3 and 4.

As shown in FIGS. 3 and 7, connector guides 26 are constructed as cut-out tabs from the body of depending rail 27, to retain and guide connectors, such as twisted wires 16 (as shown in FIGS. 3 and 4) or parallel aligned wires 36 (as shown in FIG. 7), extending from the read/write head 18 longitudinally along load beam 20.

As can readily be seen in FIG. 4, present partially thinned support pad 22 has no sharp corners to scrape or abrade wire 16 insulation. The wire-confronting surface of partially thinned support pad 22 is preferably slightly roughened by the thinning process, enabling better adhesion of adhesives applied to bond connection wires 16 to support pad 22. The partial thinning procedure provides a stepped reduction in thickness from load beam 20 surface to support pad 22 which helps to prevent "wicking" of the adhesive 23 from support pad 22 onto load beam 20 surface. Partial thinning of support pad 22 further adds to reducing the mass and height of the final head suspension assembly by providing space for the wires 16. Generally, partially thinned support pad 22 extends from load beam 20 on the side opposite the attachment of the slider or read/write head 18.

Figure 5:
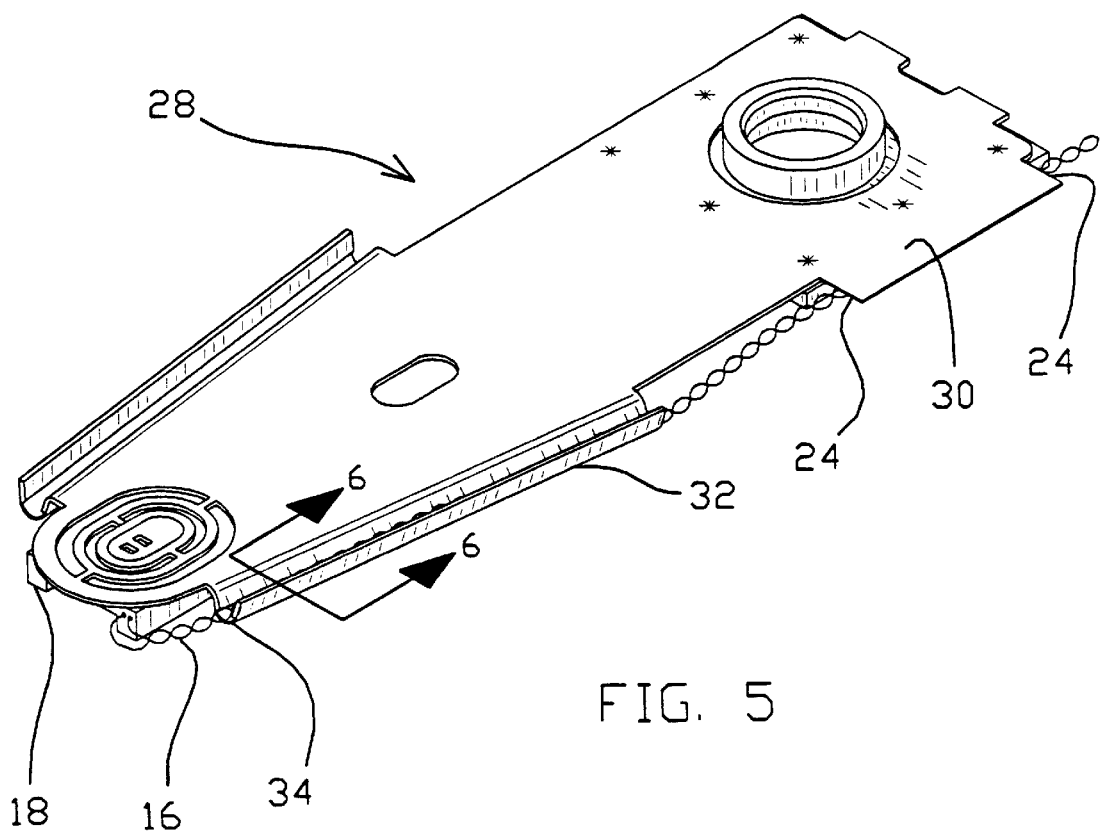
FIG. 5 is perspective view of a load beam, support pad and channel rails of the present invention.
Figure 6:
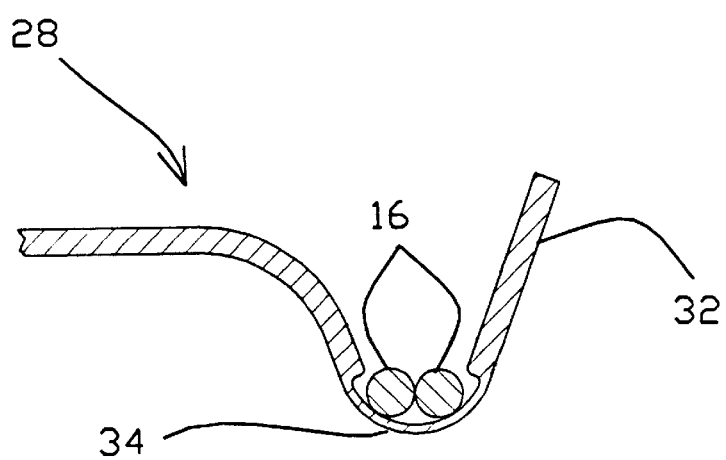
FIG. 6 is a profile view of the channel rail of FIG. 5, taken along the line 6—6, showing a partially thinned trough within the channel rails.

FIGS. 5 and 6 illustrate a perspective view of alternative load beam 28, with partially thinned support pad 30 and alternative channel rails 32, according to the present invention. Partially thinned support pad 30 is as described for support pad 22 above. FIG. 6 is a profile view of channel rail 32 of FIG. 5, taken along the line 6—6, showing wires 16 retained within partially thinned trough 34 within channel rails 32. As noted above with regard to the formation of partially thinned support pad 22, the distal and proximal edges of trough 34 are well-radiused convex edges, preferably provided by a partial etching process. Also, the partially thinned trough 34 blends into the full thickness of channel rail 32 with a well-radiused convex area. Trough 34 serves to provide a more secure capture for wires 16.

What is claimed is:

1. In a load beam of a given thickness for use in a head suspension assembly for attachment to a rigid actuator arm, a connection wire support pad extending laterally from a longitudinal edge of a base plate of said load beam, for supporting tubeless insulated connection wires along a length of the load beam for connecting a head at a flexure end of the load beam to appropriate circuitry at the rigid actuator arm, said support pad partially thinned to a thickness less than the thickness of the load beam and including a well-radiused convex curvature cross-sectional profile at a perimeter edge of the support pad to smoothly confront the connection wires and to thereby avoid unwanted abrasion and bending of the wires.

2. A load beam according to claim 1, wherein the support pad has a generally rectangular shape.

3. In a head suspension for attachment to a rigid actuator arm having a load beam with a longitudinal channel-shaped wire guide, said channel-shaped wire guide for supporting tubeless insulated wires along a length of the load beam for connecting a head at a flexure end of the load beam to appropriate circuitry at the rigid actuator arm, the improvement comprising:

providing a partially thinned trough within the channel-shaped wire guide, said partially thinned trough having a well-radiused convex curvature cross-sectional profile at a proximal end of the channel-shaped wire guide, oriented toward a flexure end of the load beam, and a well-radiused convex curvature cross-sectional profile at a distal end of the channel-shaped wire guide, oriented toward the rigid actuator arm, to smoothly confront the connection wires and to thereby avoid unwanted abrasion and bending of the wires.

* * * * *